(12) United States Patent
Mochizuki et al.

(10) Patent No.: US 9,447,855 B2
(45) Date of Patent: Sep. 20, 2016

(54) ELECTRIC ACTUATOR WITH SHOCK ABSORBING MECHANISM

(75) Inventors: Hiroaki Mochizuki, Tokyo (JP); Hiroomi Kuribayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 481 days.

(21) Appl. No.: 13/991,558

(22) PCT Filed: Dec. 19, 2011

(86) PCT No.: PCT/JP2011/079333
§ 371 (c)(1),
(2), (4) Date: Jun. 4, 2013

(87) PCT Pub. No.: WO2012/086580
PCT Pub. Date: Jun. 28, 2012

(65) Prior Publication Data
US 2013/0247700 A1    Sep. 26, 2013

(30) Foreign Application Priority Data
Dec. 22, 2010    (JP) .................................. 2010-286481

(51) Int. Cl.
*F16H 25/20*    (2006.01)
*H02K 7/06*    (2006.01)
(Continued)

(52) U.S. Cl.
CPC .............. *F16H 25/20* (2013.01); *B63H 20/10* (2013.01); *F16F 9/32* (2013.01); *F16H 25/2021* (2013.01); *H02K 7/06* (2013.01); *Y10T 74/18576* (2015.01)

(58) Field of Classification Search
CPC ... F16H 25/20; F16H 25/2021; B63H 20/10; B63H 20/106; F16F 19/32
See application file for complete search history.

(56) References Cited

U.S. PATENT DOCUMENTS

| 2,701,478 A | * | 2/1955 | Riess ...................... B64C 25/20 464/35 |
| 3,945,671 A | * | 3/1976 | Gerlach .................. F16B 21/10 292/323 |
| 4,240,334 A | * | 12/1980 | Crosser ................. F15B 15/261 92/114 |

(Continued)

FOREIGN PATENT DOCUMENTS

| JP | 3-4962 U | 1/1991 |
| JP | 07-010083 A | 1/1995 |
| JP | 09-327149 A | 12/1997 |

OTHER PUBLICATIONS

International Search report for PCT/JP2011/079333, Maling Date of Mar. 13, 2012.

*Primary Examiner* — William Kelleher
*Assistant Examiner* — Emily Cheng
(74) *Attorney, Agent, or Firm* — Westerman, Hattori, Daniels & Adrian, LLP

(57) ABSTRACT

An electric actuator is capable of easily achieving reduction in weight and size when compared to a hydraulic cylinder device, capable of being used in place of the hydraulic cylinder device, and capable of freely extending in response to a suddenly-applied impact load. An electric actuator converts rotation of an electric motor into advancing/retracting motion of an output rod using a screw shaft and a nut member mounted to the screw shaft. The output rod includes: a drive cylinder, to which the nut member is provided, the drive cylinder being arranged around the screw shaft; and a movable cylinder arranged to overlap the drive cylinder around the screw shaft and freely advancing and retreating with respect to the drive cylinder. The electric actuator further includes a releasing mechanism provided between the drive cylinder and the movable cylinder, for engaging the movable cylinder with the drive cylinder.

5 Claims, 11 Drawing Sheets

(51) Int. Cl.
   *B63H 20/10* (2006.01)
   *F16F 9/32* (2006.01)

(56) References Cited

U.S. PATENT DOCUMENTS

| | | | | |
|---|---|---|---|---|
| 4,876,906 A * | 10/1989 | Jones | ............... | B64C 13/42 244/99.9 |
| 6,123,590 A * | 9/2000 | Nakamura | ............ | B63H 20/10 440/56 |
| 7,296,380 B2 * | 11/2007 | Backman | ................ | E05F 3/102 49/139 |
| 7,610,828 B2 * | 11/2009 | Wingett | ................. | B64C 13/28 192/56.5 |
| 2009/0199482 A1 * | 8/2009 | Arenz | .................. | E05F 15/622 49/279 |
| 2010/0162838 A1 * | 7/2010 | Hirai | .................. | F16H 25/2454 74/89.33 |
| 2010/0313689 A1 * | 12/2010 | Quenerch'Du | ......... | F15B 15/14 74/89.39 |

* cited by examiner

ELECTRIC ACTUATOR WITH SHOCK ABSORBING MECHANISM

TECHNICAL FIELD

The present invention relates to an electric actuator for converting rotary motion of an electric motor into translation motion using a feed screw mechanism, and more particularly, to an electric actuator that includes a mechanism for absorbing an external impact load and can be used in place of, for example, a hydraulic cylinder device.

BACKGROUND ART

Patent Literature 1 discloses a tilt-trim device of an outboard motor that generates power by extension/contraction operation of a hydraulic cylinder device. The tilt-trim device includes: a clamp bracket fixed to a transom of a hull; a swivel bracket pivotally supported onto the clamp bracket so as to be swingable in a vertical direction; and a hydraulic cylinder device disposed between the clamp bracket and the swivel bracket. The outboard motor including a propeller and an engine is pivotally supported onto the swivel bracket so as to be swingable in a horizontal direction. The hydraulic cylinder device is caused to perform extension/contraction operation, and thus the swivel bracket tilts in the vertical direction with respect to the clamp bracket, thereby being capable of raising/lowering the outboard motor out of/into water.

Further, the tilt-trim device not only raises/lowers the outboard motor out of/into water, but also functions to protect the outboard motor from a sudden external force. That is, there is assumed a case where the outboard motor collides with obstacles such as driftwood, or hits underwater obstacles such as sunken rocks while the hull sails on water, and hence in a case where collision energy is applied to the outboard motor, it is necessary to immediately release restraining of the swivel bracket by the hydraulic cylinder device. Accordingly, a plurality of ball valves that open and close in accordance with a change in oil pressure in a cylinder are provided to the hydraulic cylinder device, and thus irrespective of operation of an oil pump, the hydraulic cylinder device can freely extend and contract in response to a sudden external force.

CITATION LIST

Patent Literature

[PTL 1] JP 07-10083 A

DISCLOSURE OF THE INVENTION

Problems to be Solved by the Invention

However, the hydraulic cylinder device requires an electric motor and an oil tank for driving the oil pump, and also requires a variety of valves and pipes for following the change in oil pressure. Further, the hydraulic cylinder device has complicated structure, and thus has a problem in that reduction in weight and size is difficult. Further, there is a fear in that an oil may leak through the pipes and the valves, and hence the hydraulic cylinder device also has a problem of a high environmental load.

Means for Solving the Problems

The present invention has been made in view of the above-mentioned cases, and has an object to provide an electric actuator capable of easily achieving reduction in weight and size when compared to the hydraulic cylinder device, capable of being used in place of the hydraulic cylinder device, and capable of freely extending and contracting in response to a suddenly-applied impact load.

That is, according to the present invention, there is provided an electric actuator, including: a housing fixed to a first structure; an output rod including a hollow portion, the output rod being fixed to a second structure and retained so as to freely protrude from and retract into the housing; a screw shaft, which is held by the housing so as to be rotatable, inserted into the hollow portion of the output rod, and is rotated by an electric motor as appropriate; and a nut member, which is provided to the output rod, mounted to the screw shaft, and is moved in an axial direction in accordance with rotation of the screw shaft. The output rod includes: a drive cylinder to which the nut member is provided, the drive cylinder being arranged around the screw shaft; and a movable cylinder to which the second structure is fixed, the movable cylinder being arranged to overlap the drive cylinder around the screw shaft and freely advancing and retreating with respect to the drive cylinder. The electric actuator further includes a releasing mechanism provided between the drive cylinder and the movable cylinder, for engaging the movable cylinder with the drive cylinder and for allowing the movable cylinder to move with respect to the drive cylinder when a predetermined or more of axial force is applied to the movable cylinder fixed to the second structure.

Effects of the Invention

In the electric actuator configured as described above, when the electric motor is rotated, the screw shaft rotates in the housing, and the output rod mounted to the screw shaft through the intermediation of the nut member advances and retreats in the axial direction around the screw shaft in accordance with a rotational direction of the screw shaft. The output rod includes the drive cylinder and the movable cylinder that is movable with respect to the drive cylinder, and the releasing mechanism is provided between the drive cylinder and the movable cylinder. Under a state in which the movable cylinder is engaged with the drive cylinder by the releasing mechanism, when the drive cylinder advances and retreats in accordance with rotation of the screw shaft, also the movable cylinder moves in the axial direction together with the drive cylinder, and thus the movable cylinder protrudes from and retracts into the housing. In this manner, it is possible to apply a pressing force to the first structure to which the housing is fixed, and to the second structure to which the movable cylinder is fixed.

On the other hand, when an impact load is applied to the first structure and the second structure and a predetermined or more of axial force is applied to the movable cylinder, the releasing mechanism allows the movable cylinder to move with respect to the drive cylinder, and hence the movable cylinder can protrude from and retract into the housing irrespective of advance and retreat of the drive cylinder. In this manner, even in a case where the impact load is applied to the first structure and the second structure, the movable cylinder can be freely protruded from and retracted into the housing, and breakage of the electric actuator due to application of the impact load can be prevented.

MODE FOR CARRYING OUT THE INVENTION

In the following, an electric actuator according to the present invention is described in detail with reference to the attached drawings.

Figure 1:
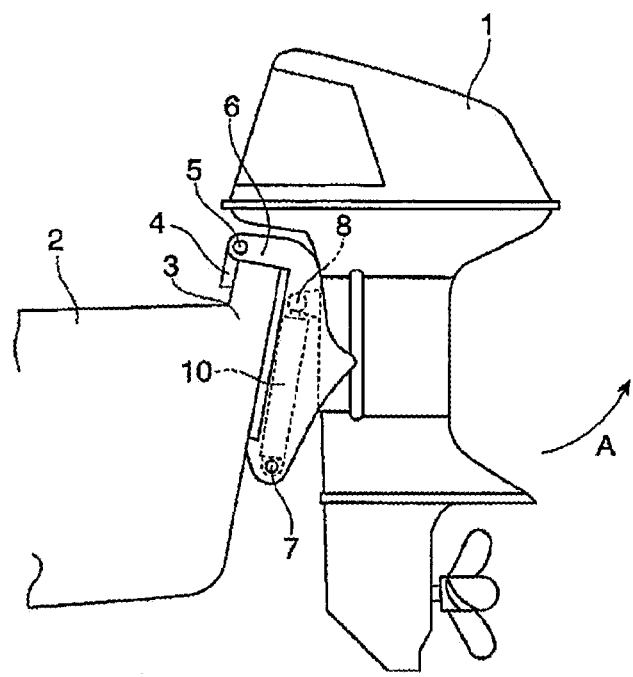
FIG. 1 A view illustrating an example of a tilt-trim device of an outboard motor, which is configured using an electric actuator according to the present invention.

FIG. 1 is a view illustrating an example of a tilt-trim device of an outboard motor, which is configured using the electric actuator according to the present invention. The tilt-trim device is used to mount an outboard motor 1 onto a transom 3 of a hull 2. The tilt-trim device includes: a clamp bracket 4 serving as a first structure fixed to the transom 3; a swivel bracket 6 serving as a second structure that supports the outboard motor 1 and is coupled to the clamp bracket 4 so as to be swingable about a swing shaft 5; and an electric actuator 10 having one end coupled to the clamp bracket 4 through the intermediation of a pin 7, and having another end coupled to the swivel bracket 6 through the intermediation of a pin 3. When the electric actuator 10 is driven so that the electric actuator 10 extends, the swivel bracket 6 swings about the swing shaft 5 in a vertical direction (up-and-down direction of the drawing sheet), and thus can lift the outboard motor 1 up in an arrow "A" direction with respect to the hull 2.

Figure 2:
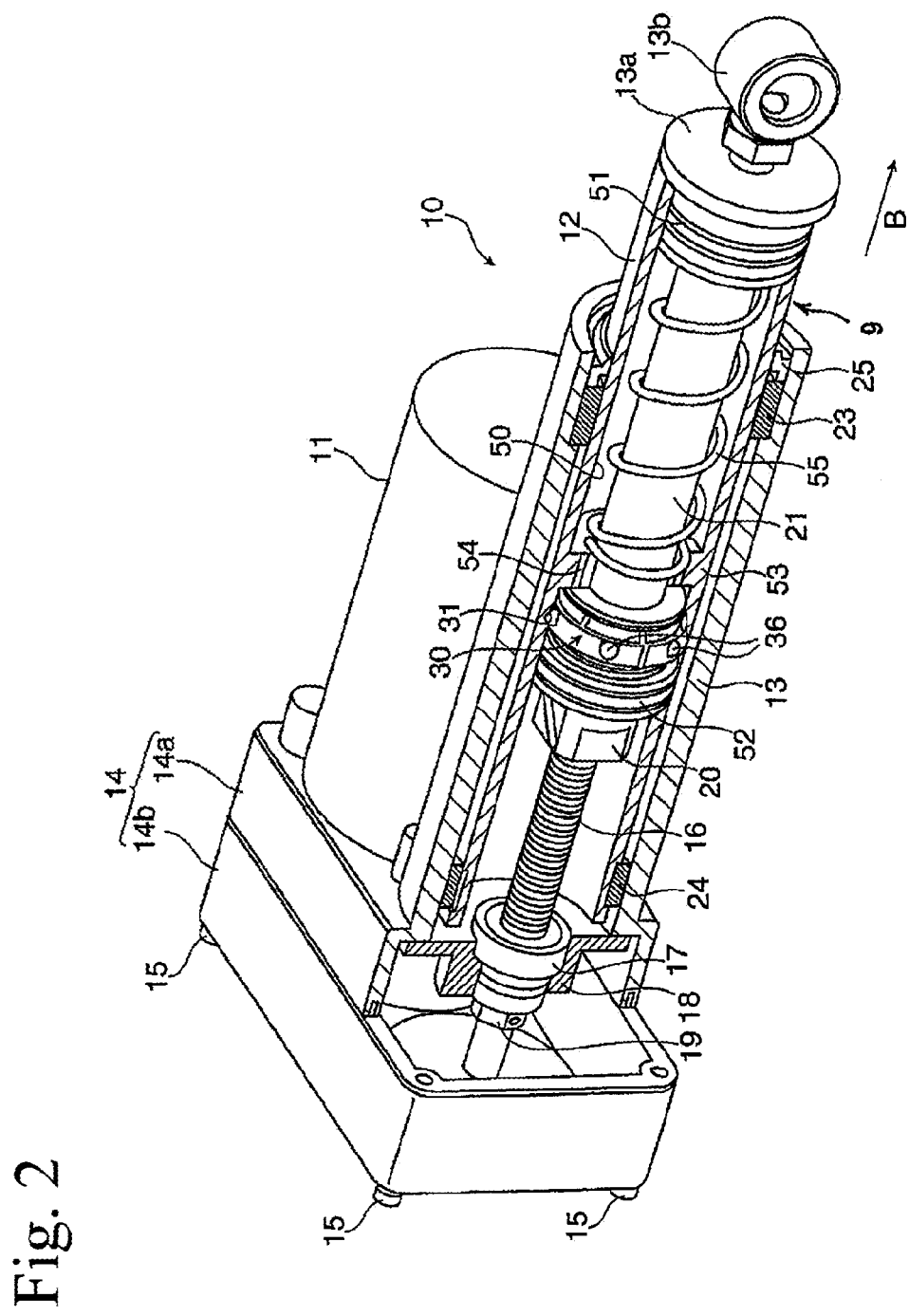
FIG. 2 A perspective view of an electric actuator according to a first embodiment of the present invention.

FIG. 2 is a perspective view of the electric actuator 10 according to a first embodiment of the present invention, and is also a partial cross-sectional view of the electric actuator 10 for the sake of understanding of internal structure. Using a screw motion mechanism, the electric actuator 10 converts rotary motion output from an electric motor 11 into translation motion of an output rod 9. In accordance with rotation of the electric motor 11, the electric actuator 10 can protrude the output rod 9 in an arrow "B" direction from a tip of a housing 13 formed into a cylindrical shape, or can retract the output rod 9 into the housing 13.

The housing 13 is protruded from a gear case 14, and the electric motor 11 is fixed to the gear case 14 in parallel with the housing 13. Further, the gear case 14 includes: a base casing 14a formed integrally with the housing 13; and a cover casing 14b fixed to the base casing 14a with bolts 15. A gasket is interposed between the base casing 14a and the cover casing 14b to ensure a sealing property of the gear case 14. Inside the gear case 14, a reduction gear train for transmitting rotation of the electric motor 11 to a screw shaft described later is accommodated.

Although not shown, in the gear case 14, there is formed a clevis for allowing the pin 7 coupled to the clamp bracket 4 to pass therethrough.

Further, in a center of a hollow portion of the housing 13 formed into a cylindrical shape, a screw shaft 16 forming the screw motion mechanism is arranged. The screw shaft 16 is rotatably held by the base casing 14a and the housing 13 through the intermediation of a bearing 17 and a bearing case 18. A reduction gear is coupled through the intermediation of a coupling 19 to an axial end of the screw shaft 16 inserted into the gear case 14.

A rolling groove for balls is formed in an outer peripheral surface of the screw shaft in a spiral manner. A nut member 20 is mounted to the screw shaft through the intermediation of a large number of balls. The nut member 20 includes the large number of balls that roll on the rolling groove of the screw shaft, and further includes an endless circulation passage for the balls. A cylindrical drive cylinder 21 including a hollow portion is fixed to the nut member 20, and the axial end of the screw shaft 16 passing through the nut member 20 is accommodated in the hollow portion of the drive cylinder 21. That is, the nut member 20 and the screw shaft 16 form a ball screw device, and in accordance with rotation of the screw shaft 16, the nut member 20 advances and retreats in the hollow portion of the housing 13 in an axial direction together with the drive cylinder 21. It should be noted that the screw motion mechanism formed by the screw shaft 16 and the nut member 20 is not limited to the ball screw device, but a slide screw device may be employed. However, in view of reduction in rotation torque necessary for the screw shaft 16 and reduction in size of the electric motor, the ball screw device is suitable. Further, it is only necessary that the nut member 20 be provided to the drive cylinder 21 as a part of the drive cylinder 21. The nut member 20 may be fixed to the drive cylinder 21 as illustrated in FIG. 2, or structure of the nut member 20 may be provided directly to the part of the drive cylinder 21.

On the other hand, a cylindrical movable cylinder 12 covering the screw shaft 16 and the drive cylinder 21 is accommodated in the hollow portion of the housing 13. The movable cylinder 12 is arranged to overlap the drive cylinder 21 around the screw shaft 16, and the drive cylinder 21 and the movable cylinder 12 are combined together to form the output rod 9. An axial length of the movable cylinder 12 is set to be larger than an axial length of the housing 13, and a part of the movable cylinder 12 is protruded from the housing 13 through an opening of the housing 13 which is opposite to the gear case 14. An opening formed in an axial end of the movable cylinder 12 protruded from the housing 13 is closed by a cap member 13a, and in the cap member 13a, there is formed a clevis 13b for allowing the pin 8 coupled to the swivel bracket 6 to pass therethrough.

The movable cylinder 12 is mounted to the housing 13 through the intermediation of a pair of bearing bushes 23, 24, and is held by the housing 13 so as to be movable in the axial direction. One bearing bush 23 is fixed to an end portion of the housing 13 opposite to the gear case 14, and is held in contact with an outer peripheral surface of the movable cylinder 12. Another bearing bush 24 is fixed to an end portion of the movable cylinder 12 close to the gear case 14, and is held in contact with an inner peripheral surface of the housing 13. FIG. 2 illustrates a state in which the movable cylinder 12 is retracted into the housing 13. When the movable cylinder 12 is moved in the arrow "B" direction so as to protrude from the housing 13, the bearing bush 24 moves while being held in slide-contact with the inner peripheral surface of the housing 13, and comes close to the one bearing bush 23 fixed to the housing 13. In this manner, while the movable cylinder 12 is firmly held by the housing 13, the movable cylinder 12 can be protruded from and retracted into the housing 13. It should be noted that reference numeral 25 denotes a seal member for sealing a gap between the housing 13 and the movable cylinder 12 at an opening edge of the housing 13.

Further, a releasing mechanism 30 for engaging the movable cylinder 12 with the drive cylinder 21 is provided between the drive cylinder 21 and the movable cylinder 12. The releasing mechanism 30 includes: an annular engaging groove 31 formed in an inner peripheral surface of the movable cylinder 12 along a peripheral direction so as to have a V-shaped cross-section; and one or a plurality of engaging elements 36 retained onto the outer peripheral surface of the drive cylinder 21 and biased toward the engaging groove 31. Each engaging element 36 has a convex spherical surface. The engaging element 36 is biased toward the engaging groove 31, and thus the convex spherical surface is fitted into the engaging groove 31, with the result that the movable cylinder 12 is engaged with the drive cylinder 21.

Figure 3:
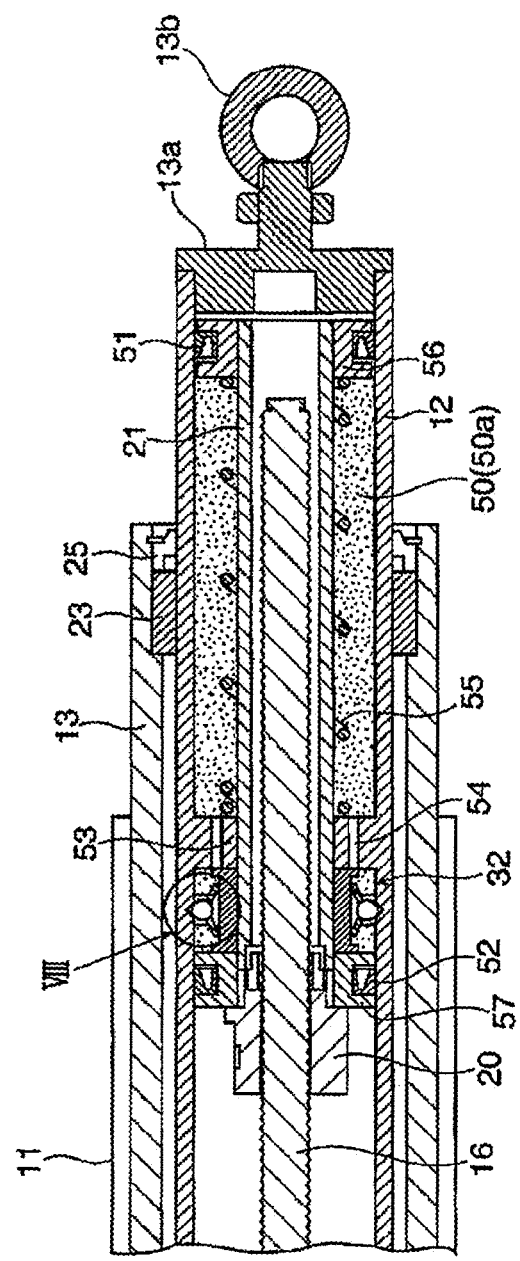
FIG. 3 A front cross-sectional view illustrating a state in which an outer cylinder is set at an engaged position in the electric actuator according to the first embodiment of the present invention.

FIG. 3 is a front cross-sectional view illustrating a state in which the releasing mechanism 30 engages the movable cylinder 12 with the drive cylinder 21, and the gear case 14 is omitted in FIG. 3. In this state, the engaging element 36 retained onto the drive cylinder 21 partially enters the engaging groove 31 formed in the movable cylinder 12. When the drive cylinder 21 moves in the axial direction, also the movable cylinder 12 moves together in the axial direction. That is, when the electric motor 11 is driven to rotate the screw shaft 16, the nut member 20 threadingly engaged with the screw shaft 16, and the drive cylinder 21 fixed to the nut member 20 move in the axial direction, and then also the movable cylinder 12 engaged by the releasing mechanism 30 with the drive cylinder 21 moves in the axial direction. In this manner, in accordance with a rotational direction of the electric motor 11, the movable cylinder 12 can be protruded from the housing 13 by an arbitrary amount, or the movable cylinder 12 can be retracted into the housing 13.

The drive cylinder 21 and the movable cylinder 12 form the output rod 9 that is retained so as to freely protrude from and retract into the housing 13. Under a state in which the releasing mechanism 30 engages the movable cylinder 12 with the drive cylinder 21, the entire output rod 9 protrudes and retracts in accordance with rotation of the screw shaft 16.

Figure 4:
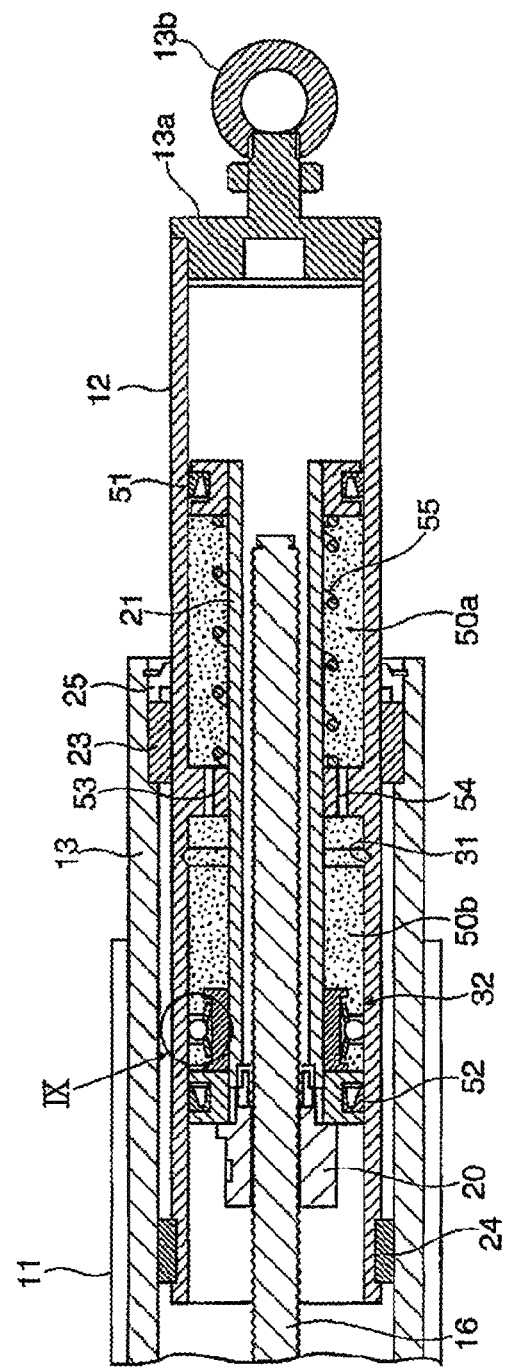
FIG. 4 A front cross-sectional view illustrating a state in which the outer cylinder is disengaged from the engaged position in the electric actuator according to the first embodiment of the present invention.

On the other hand, FIG. 4 is a front cross-sectional view illustrating a state in which engagement of the movable cylinder 12 with the drive cylinder 21 is released and the movable cylinder 12 protrudes from the housing 13 irrespective of a stopping position of the drive cylinder 21. The engaging element 36 of the releasing mechanism 30 is biased toward the engaging groove 31 of the movable cylinder 12. Accordingly, when a large axial load is applied to the movable cylinder 12 under a state in which the electric motor 11 is stopped, that is, under a state in which the drive cylinder 21 is retained at a certain position with respect to the housing 13, the engaging element 36 is disengaged from the engaging groove 31 of the movable cylinder 12, and the engagement of the movable cylinder 12 with the drive cylinder 21 is released. In this manner, the movable cylinder 12 is separated from the drive cylinder 21, and thus can freely move in the axial direction with respect to the housing 13. For example, without moving the drive cylinder 21 from the state illustrated in FIG. 3, only the movable cylinder 12 can be drawn out from the housing 13 as illustrated in FIG. 4.

It should be noted that, in this embodiment, the engaging groove 31 is formed in the inner peripheral surface of the movable cylinder 12, and the engaging element 36 is retained onto the outer peripheral surface of the drive cylinder 21. Conversely, the engaging element 36 may be retained onto the inner peripheral surface of the movable cylinder 12, and the engaging groove 31 may be formed in the outer peripheral surface of the drive cylinder 21.

Figure 5:
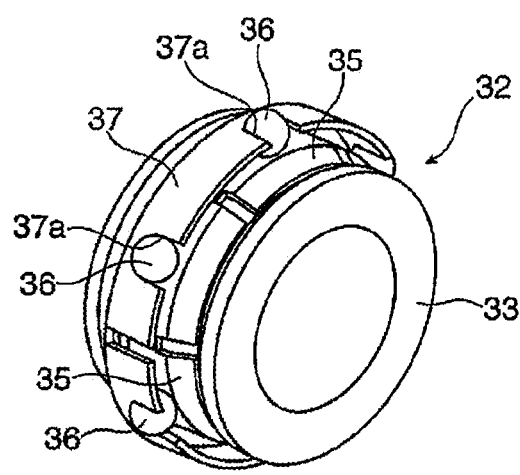
FIG. 5 A perspective view illustrating an example of a ball plunger according to the embodiment of the present invention.
Figure 6:
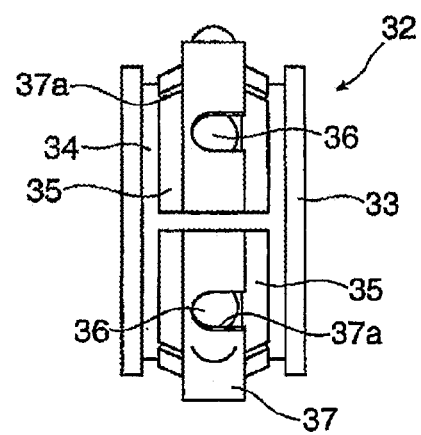
FIG. 6 A front view of the ball plunger illustrated in FIG. 5.

FIGS. 5 and 6 illustrate the engaging elements 36 and a specific configuration for biasing the engaging elements 36 toward the inner peripheral surface of the movable cylinder 12, and illustrate a ball plunger in which a plurality of steel balls serving as the engaging elements 36 are arranged. When used, a ball plunger 32 is fixed to the outer peripheral surface of the drive cylinder 21. FIG. 5 is a perspective view of the ball plunger 32 detached from the drive cylinder 21, and FIG. 6 is a front view of the ball plunger 32. The ball plunger 32 includes: a ring member 33 fitted onto the outer peripheral surface of the drive cylinder 21; a pair of plate springs 35 arranged in a recessed groove 34 formed in an outer peripheral surface of the ring member 33; the plurality of engaging elements 36 biased by the plate springs 35 toward the engaging groove 31; and a ring-shaped retainer 37 for preventing the engaging elements 36 from falling off.

Figure 7:
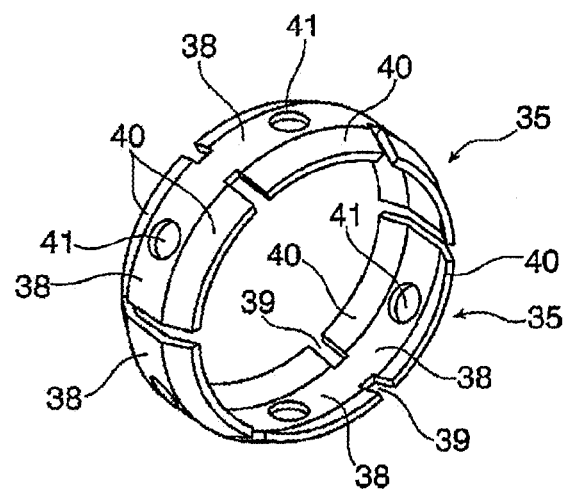
FIG. 7 A perspective view of plate springs for use in the ball plunger illustrated in FIG. 5.

As illustrated in FIG. 7, each of the plate springs 35 is formed by curving a metal plate into a semicircular shape, and the pair of plate springs 35 is arranged around the ring member 33. In the ball plunger 32, six steel balls serving as the engaging elements 36 are arranged around the ring member 33 at equal intervals, and three pressing portions 38 corresponding to the steel balls 36 are provided in each of the plate springs 35. Slits 39 extending from edges of each of the plate springs 35 are formed between the adjacent pressing portions 38 so as to be opposed to each other, and regions of each of the pressing portions 38, which are divided by the slits 39, are bent as leg portions 40 toward the ring member 33. Further, a through-hole 41 for positioning the steel ball as the engaging element 36 is formed in a center of each of the pressing portions 38, and the through-hole 41 is formed so as to have a diameter smaller than a diameter of the steel ball 36.

In addition, the retainer 37 is formed by curving a metal plate into a substantially C-shape. Cutout grooves 37a are formed in one edge of the retainer 37 so as to correspond to the six steel balls 36 arranged in the plate springs 35, and a groove width of each of the cutout grooves 37a is set to be smaller than the diameter of the steel ball 36. After the plate springs 35 and the steel balls 36 are arranged around the ring member 33, the retainer 37 is covered on an outer side of the ring member 33 from the axial direction of the ring member 33. At this time, each steel ball 36 arranged on the plate spring 35 enters each cutout groove 37a formed in the retainer 37, and the steel ball 36 is restrained between the cutout groove 37a of the retainer 37 and the through-hole 41 formed in the pressing portion 38 of the plate spring 35. In this manner, assembly of the ball plunger 32 is completed. As long as the retainer 37 is detached from the ring member 33, the steel balls 36 and the plate springs 35 do not fall off from the ring member 33.

Figure 8:
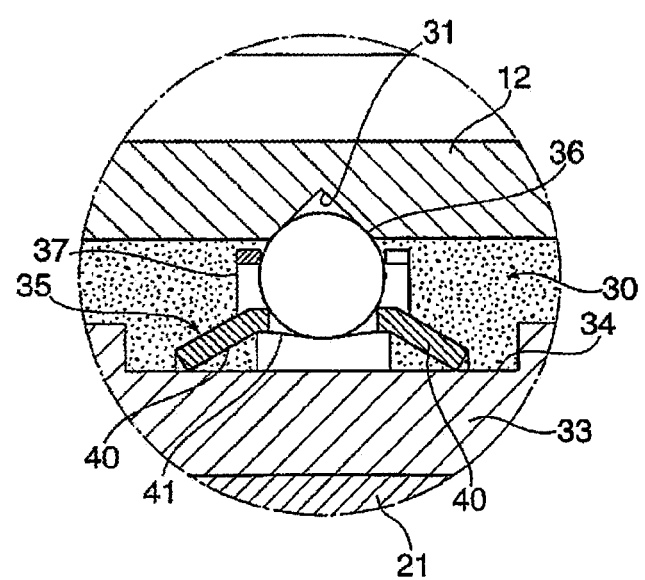
FIG. 8 An enlarged view illustrating details of a region VIII of FIG. 3.
Figure 9:
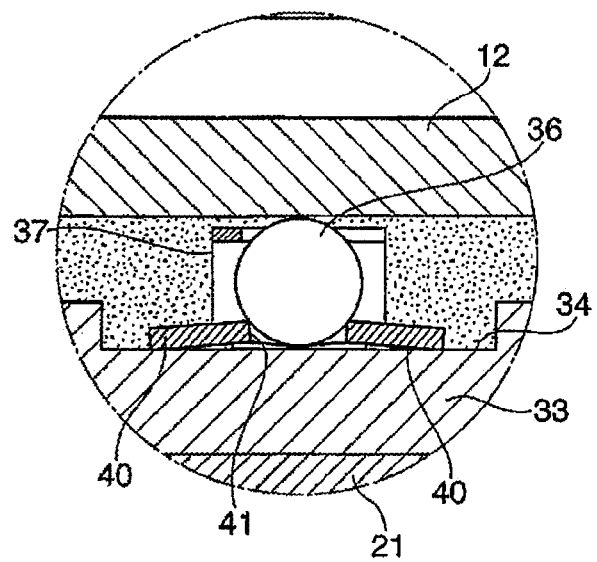
FIG. 9 An enlarged view illustrating details of a region IX of FIG. 4.

FIGS. 8 and 9 are enlarged views illustrating an operation state of the releasing mechanism 30. FIG. 8 illustrates a state in which the movable cylinder 12 is engaged with the drive cylinder 21, and FIG. 9 illustrates a state in which the movable cylinder 12 is separated from the drive cylinder 21 and the movable cylinder 12 is allowed to move with respect to the drive cylinder 21. Under a state in which the movable cylinder 12 is most retracted into the drive cylinder 21 as illustrated in FIG. 3, each steel ball 36 of the ball plunger 32 is opposed to the engaging groove 31 of the movable cylinder 12. As illustrated in FIG. 8, the leg portions 40 of the plate spring 35 of the ball plunger 32 are held in contact with the ring member 33, and the steel ball 36 is placed in the through-hole 41 formed in the pressing portion 38 of the plate spring 35. The pressing portion 38 of the plate spring 35 biases the steel ball 36 in a direction of separating the steel ball 36 from the ring member 33 (upward direction of the drawing sheet), that is, biases the steel ball 36 toward the movable cylinder 12 situated on a radially outer side of the ball plunger 32, and the spherical surface of the steel ball 36 is partially fitted into the opposing engaging groove 31. Accordingly, the steel ball 36 restrains the movable cylinder 12 with respect to the plate spring 35, and each plate spring 35 is arranged in the recessed groove 34 of the ring member 33 fixed to the drive cylinder 21. As a result, the movable cylinder 12 is restrained with respect to the drive cylinder 21. Thus, the movable cylinder 12 is engaged with the drive cylinder 21. When the drive cylinder 21 moves in the axial direction (right-and-left direction of the drawing sheet), also the movable cylinder 12 moves in the axial direction together with the drive cylinder 21.

On the other hand, when a large axial external force is applied to the movable cylinder 12 in the state illustrated in FIG. 8, the engaging groove 31, which is formed so as to have a V-shaped cross-section, presses the steel ball 36 toward the drive cylinder 21 in a radial direction. When the pressing force overcomes a biasing force of the plate spring 35, as illustrated in FIG. 9, the leg portions 40 of the plate spring 35 are elastically deformed, and then the steel ball 36 is disengaged from the engaging groove 31 of the movable cylinder 12. In this manner, the engagement of the movable cylinder 12 with the drive cylinder 21 is released, and thus the movable cylinder 12 can move freely in the axial direction irrespective of rotation of the electric motor 11 and protrude from the housing 13. A magnitude of the axial external force, which is required to release the engagement of the movable cylinder 12 with the drive cylinder 21, can be set arbitrarily through adjustment of the biasing force of the plate spring 35 of the ball plunger 32, a cross-sectional shape of the engaging groove 31 formed in the movable cylinder 12, and the diameter of the steel ball 36 with respect to the groove width of the engaging groove 31.

It should be noted that the engaging groove 31 and the ball plunger 32 are merely an example of the releasing mechanism 30. For example, as long as the engaging groove 31 is formed at a position opposed to the engaging element 36, it is not necessary that the engaging groove 31 be formed of an annular groove extending continuously along the peripheral direction. Further, as long as a tip of the engaging element 36 enters the engaging groove 31, but the engaging element 36 can be disengaged from the engaging groove 31 depending on the external force, it is not necessary that the engaging element 36 be formed of a steel ball. For example, the engaging element 36 may be formed of a pin member having a convex spherical surface at its tip.

By the way, for example, when a large external force is applied to the movable cylinder 12 in a direction of drawing out the movable cylinder 12 from the housing 13, the engagement of the movable cylinder 12 with the drive cylinder 21 by the releasing mechanism 30 is released as described above, and thus the movable cylinder 12 is allowed to move with respect to the drive cylinder 21, there is a fear in that the movable cylinder 12 protrudes from the housing 13 forcibly due to the applied external force. When such a behavior occurs in the movable cylinder 12, for example, in the tilt-trim device illustrated in FIG. 1, the outboard motor 1 may bounce up suddenly, which is dangerous. In addition, the electric actuator 10 itself may break.

Accordingly, in the electric actuator 10 according to the first embodiment, a damping mechanism for suppressing sudden slide of the movable cylinder 12 with respect to the drive cylinder 21 is provided to the output rod 9. The drive cylinder 21 is formed so as to have a length slightly larger than a half of the axial length of the movable cylinder 12, and as illustrated in FIG. 3, a working chamber 50 in which a viscous fluid such as an oil is hermetically contained is formed between the outer peripheral surface of the drive cylinder 21 and the inner peripheral surface of the movable cylinder 12. Further, in order to seal the working chamber 50, a pair of oil seals 51, 52 is retained at both axial ends of the drive cylinder 21 through the intermediation of flange members 56, 57. The oil seals 51, 52 are held in contact with the inner peripheral surface of the movable cylinder 12. The ball plunger 32 is fixed onto the outer peripheral surface of the drive cylinder 21 at a position adjacent to the oil seal 52, and is situated inside the working chamber 50. Accordingly, the viscous fluid hermetically contained in the working chamber 50 also has a function of preventing abrasion of the steel balls 36 of the ball plunger.

On the other hand, a partition wall 53 is provided inside the working chamber 50 defined by the pair of oil seals 51, 52. The partition wall 53 is formed substantially at an axial center of the movable cylinder 12, and is projected from the inner peripheral surface of the movable cylinder 12 radially inward to be held in contact with the outer peripheral surface of the drive cylinder 21. Accordingly, when the engagement of the movable cylinder 12 with the drive cylinder 21 by the releasing mechanism 30 is released and thus the movable cylinder 12 moves in the axial direction with respect to the drive cylinder 21, as illustrated in FIG. 4, the partition wall 53 moves inside the working chamber 50 in the axial direction between the pair of oil seals 51, 52 retained at both the axial ends of the drive cylinder 21. Thus, the working chamber 50 is partitioned by the partition wall 53 into a first working chamber 50a and a second working chamber 50b. Further, a plurality of orifices 54 pass through the partition wall 53 along the axial direction. When the partition wall moves inside the working chamber 50, the viscous fluid flows from the first working chamber 50a into the second working chamber 50b. It should be noted that, under a state in which the movable cylinder 12 is engaged with the drive cylinder 21, that is, under the state illustrated in FIG. 3, the partition wall 53 is situated on the oil seal 52 side and held in contact with the ball plunger 32, and the second working chamber 50b is formed only around the ball plunger.

Therefore, when the engagement of the movable cylinder 12 with the drive cylinder 21 by the releasing mechanism 30 is released and thus the movable cylinder 12 starts moving with respect to the drive cylinder 21 due to the applied external force, the partition wall 53 moves in the axial direction while being held in slide-contact with the outer peripheral surface of the drive cylinder 21, and then the second working chamber 50b is formed between the partition wall 53 and the oil seal 52. Along with this, the viscous fluid hermetically contained in the first working chamber 50a flows into the second working chamber 50b through the orifices 54. However, a sectional area of the orifices 54 is extremely smaller than a sectional area of the working chamber 50, and hence resistance to flow acts on the viscous fluid. That is, structure modeled after an oil damper is imparted to the output rod 9 by the working chamber 50, the partition wall 53, and the orifices 54. The damping mechanism as described above is provided in the electric actuator, and hence even when the engagement of the movable cylinder 12 with the drive cylinder 21 by the releasing mechanism 30 is released, it is possible to avoid a risk that the movable cylinder 12 suddenly rushes out of the housing 13. In addition, it is also possible to avoid a risk that the movable cylinder 12 in a free state (state illustrated in FIG. 4) is suddenly pushed into the housing 13.

Further, between the drive cylinder 21 and the movable cylinder 12, there is provided an elastic member 55 for restoring, to the engaged position illustrated in FIG. 3, the movable cylinder 12 released from the engagement with the drive cylinder 21. Specifically, a coil spring as the elastic member 55 is provided inside the first working chamber 50a, and the coil spring 55 is arranged between the partition wall 53 and the flange member 56 for retaining the oil seal 51. The coil spring 55 has a free length under a state in which the movable cylinder 12 is engaged with the drive cylinder 21, that is, under a state in which the first working chamber 50a is set to a maximum size, and both ends of the coil spring 55 are held in contact with the flange member 56 and the partition wall 53, respectively. As the partition wall 53 moves with respect to the drive cylinder 21 along with release of the engagement of the movable cylinder 12 and thus the second working chamber 50b is formed, the coil spring 55 is gradually compressed as illustrated in FIG. 4, to thereby exert a biasing force of pushing the movable cylinder 12 back to the engaged position.

Accordingly, even in a case where the engagement of the movable cylinder 12 with the drive cylinder 2 by the releasing mechanism 30 is released and thus the movable cylinder 12 moves freely with respect to the drive cylinder 21, the coil spring 55 exerts the biasing force of pushing the movable cylinder 12 back to the engaged position. Accordingly, when an external force that has triggered release of the engagement is eliminated from the movable cylinder 12, the movable cylinder 12 restores to the engaged position by itself, and the releasing mechanism 30 engages the movable cylinder 12 with the drive cylinder 21 again. In this manner, the movable cylinder 12 and the drive cylinder 21 can be integrated together.

It should be noted that the releasing mechanism 30 is not necessarily formed of the above-mentioned combination of the engaging groove 31 and the engaging element 36. For example, there may be provided an elastic member for pressing the movable cylinder 12 with respect to the drive cylinder 21 in the axial direction with a predetermined biasing force. With this configuration, only in a case where an external force that overcomes the biasing force is applied to the movable cylinder 12, the movable cylinder 12 can be allowed to move with respect to the drive cylinder 21. As an example, it is possible to cause the coil spring 55 to exert the function of the releasing mechanism 30 through adjustment of the biasing force of the coil spring 55. In this case, the engaging groove 31 and the engaging element 36 can be omitted. Further, the elastic member that can be used as the releasing mechanism 30 is not limited to a linear spring. A non-linear spring such as a variable pitch coil spring can be also used.

In the electric actuator 10 configured as described above, as illustrated in FIG. 3, a state in which the drive cylinder 21 is most fitted into the hollow portion of the movable cylinder 12 corresponds to a state in which the electric actuator 10 has a shortest length. At this time, the releasing mechanism 30 engages the movable cylinder 12 with the drive cylinder 21. When assuming a case where the electric actuator 10 is applied to the tilt-trim device of the outboard motor 1, the above-mentioned state corresponds to a state in which a propeller of the outboard motor 1 is lowered into water as illustrated in FIG. 1. In this state, the hull 2 can sail.

When the electric motor 11 is rotated in this state, the drive cylinder 21 that is threadingly engaged with the screw shaft 16 through the intermediation of the nut member 20 moves in the axial direction in the housing 13. Along with this, the movable cylinder 12 engaged with the drive cylinder 21 moves together with the drive cylinder 21 to protrude from the housing 13, and thus an entire length of the electric actuator 10 becomes gradually longer. In this manner, the tilt-trim device tilts the outboard motor 1 in the arrow "A" direction, and thus can raise the propeller out of water onto water.

On the other hand, when assuming a case where underwater obstacles such as driftwood collide with the outboard motor 1 while the outboard motor 1 is set to the state illustrated in FIG. 1 and the hull 2 sails, due to collision between the obstacles and the outboard motor 1, an axial impact load is applied to the movable cylinder 12 of the electric actuator 10 coupled to the swivel bracket 6, and hence the engaging element 36 of the releasing mechanism 30 is disengaged from the engaging groove 31 of the movable cylinder 12. As a result, the engagement of the movable cylinder 12 with the drive cylinder 21 is released, and the movable cylinder 12 is allowed to move with respect to the drive cylinder 21. Accordingly, even though the electric motor 11 is stopped, the movable cylinder 12 can protrude from the housing 13, and the swivel bracket 6 supporting the outboard motor 1 can tilt freely in the arrow "A" direction. In this manner, it is possible to prevent breakage of the outboard motor 1 and the tilt-trim device due to collision with the obstacles.

Further, when the movable cylinder 12 of the electric actuator 10 protrudes from the housing 13 due to the impact load, the damping mechanism provided between the drive cylinder 21 and the movable cylinder 12 works and applies resistance against sudden protrusion of the movable cylinder 12. Accordingly, even when the engagement by the releasing mechanism 30 is released, the movable cylinder 12 is not drawn out from the housing 13 instantaneously, and hence breakage of the electric actuator 10 can be prevented. Further, regarding the tilt-trim device, even when the swivel bracket 6 tilts freely due to collision with the obstacles, it is possible to prevent the outboard motor 1 from bouncing up suddenly due to impact of collision, and to use the outboard motor 1 safely.

In addition, even when the movable cylinder 12 is drawn out from the housing 13 due to the unexpected impact load as described above, the biasing force of the coil spring 55 biases the movable cylinder 12 toward the engaged position at which the movable cylinder 12 is engaged with the drive cylinder 21. Accordingly, when the axial external force applied to the movable cylinder 12 is eliminated, the movable cylinder 12 swiftly restores to the engaged position, and then is engaged with the drive cylinder 21. After that, the movable cylinder 12 follows movement of the drive cylinder 21 in accordance with rotation of the electric motor 11. When this is applied to the tilt-trim device, even when the swivel bracket 6 temporarily tilts in the arrow "A" direction due to collision with the obstacles, the swivel bracket 6 promptly restores to the original state, that is, automatically restores to a sailing state in which the swivel bracket 6 is restrained by the electric actuator 10.

As described above, the electric actuator 10 to which the present invention is applied is most suitable as substitution of a hydraulic cylinder device. In addition, the electric actuator 10 has simpler structure as compared to structure of the hydraulic cylinder device, and hence it is possible to easily achieve reduction in size and cost. Further, the electric actuator 10 does not have a risk of oil leakage unlike the hydraulic cylinder device, and hence it is also possible to reduce an environmental load.

Next, an electric actuator according to a second embodiment of the present invention is described.

Figure 10:
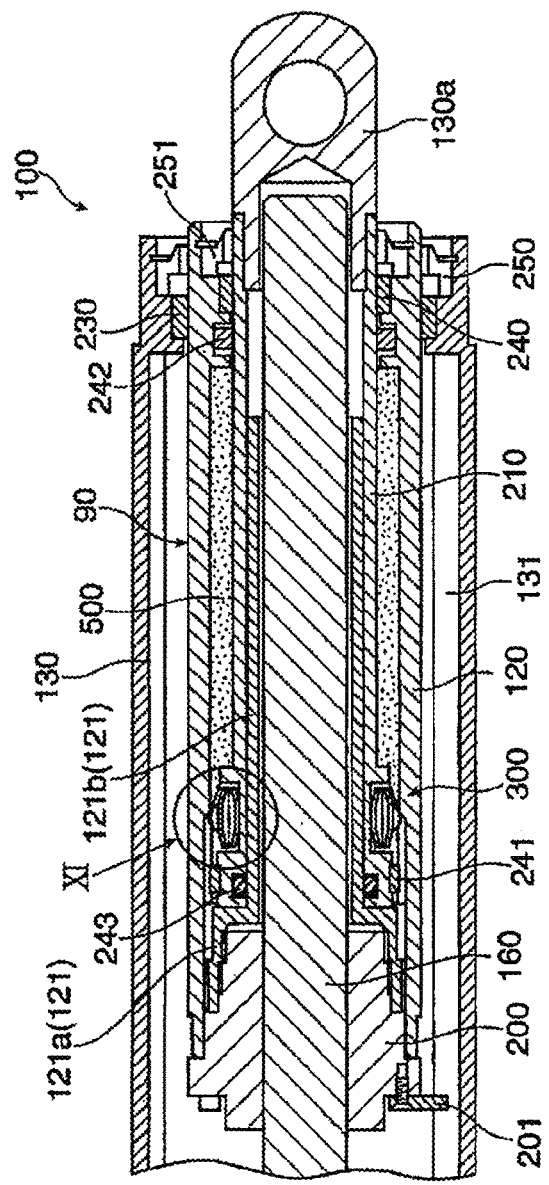
FIG. 10 A front cross-sectional view of an electric actuator according to a second embodiment of the present invention.

FIG. 10 is a front cross-sectional view of an electric actuator 100 according to the second embodiment, and illustrates a state in which an output rod 90 is retracted into a housing 130, that is, a state in which the electric actuator 100 has a shortest axial length. It should be noted that the gear case 14 is omitted in FIG. 10 similarly to FIG. 3 illustrating the first embodiment.

In a center of a hollow portion of the housing 130 formed into a cylindrical shape, a screw shaft 160 forming a screw motion mechanism is arranged. A nut member 200 is mounted to the screw shaft 160 through the intermediation of a large number of balls. The screw shaft 160 is held by a bearing (not shown) so as to be rotatable with respect to the housing 130, and rotation of an electric motor is transmitted to the screw shaft 160 through the intermediation of a reduction gear. A combination of the screw shaft 160 and the nut member 200 forms a ball screw device.

A drive cylinder 120 including a hollow portion is fixed to the nut member 200, and the screw shaft 160 passes through the hollow portion of the drive cylinder 120. The drive cylinder 120 is provided in the hollow portion of the housing 130 formed into a cylindrical shape. When the screw shaft 160 is rotated, in accordance with the rotation, the drive cylinder 120 advances and retreats in the hollow portion of the housing 130 in the axial direction together with the nut member 200. At an opening end of the housing 130, there are provided a bearing bush 230 held in slide-contact with an outer peripheral surface of the drive cylinder 120, and a seal member 250 for sealing a gap between the housing 130 and the drive cylinder 120. Further, in order to prevent the nut member 200 from rotating along with rotation of the screw shaft 160, a rotation preventing member 201 is fixed to the nut member 200. On the other hand, a guide groove 131 is formed in an inner peripheral surface of the housing 130 along a moving direction of the drive cylinder 120, and a tip of the rotation preventing member 201 is inserted into the guide groove 131.

Further, an extended cylinder 121 having a cylindrical shape is provided in the hollow portion of the drive cylinder 120 and around the screw shaft 160. The extended cylinder 121 is fixed to the nut member 200 similarly to the drive cylinder 120. The extended cylinder 121 includes a large diameter portion 121a and a small diameter portion 121b. The nut member 200 is fixed to an inner peripheral surface of the large diameter portion 121a, whereas the screw shaft 160 passes through the small diameter portion 121b. An axial length of the extended cylinder 121 is set to be smaller than an axial length of the drive cylinder 120. It should be noted that the extended cylinder 121 may be formed integrally with the nut member 200 as a part of the nut member 200.

An annular space is formed between the small diameter portion 121b of the extended cylinder 121 and the drive cylinder 120, and a movable cylinder 210 is accommodated in the annular space. An inner diameter of the movable cylinder 210 is set to be larger than an outer diameter of the small diameter portion 121b of the extended cylinder 121, whereas an outer diameter of the movable cylinder 210 is set to be smaller than an inner diameter of the drive cylinder 120. The screw shaft 160 and the small diameter portion 121b of the extended cylinder 121 are accommodated in a hollow portion of the movable cylinder 210. That is, the extended cylinder 121, the movable cylinder 210, and the drive cylinder 120 are arranged around the screw shaft 160 to overlap one another.

The movable cylinder 210 is arranged so as to freely advance and retreat with respect to the drive cylinder 120, and can move in the annular space in the axial direction. The movable cylinder 210 is combined with the drive cylinder 120 to form the output rod 90. FIG. 10 illustrates a state in which the movable cylinder 210 is most retracted into the drive cylinder 120. In this state, the output rod 90 has a shortest axial length. At an opening end of the drive cylinder 120, that is, at an end portion thereof opposite to an end fixed to the nut member 200, a bearing bush 240 held in slide-contact with an outer peripheral surface of the movable cylinder 210 is provided. On the other hand, at an end portion of the movable cylinder 210 on the nut member 200 side, a piston bearing 241 held in slide-contact with the inner peripheral surface of the drive cylinder 120 is provided.

When the movable cylinder 210 is moved in the axial direction with respect to the drive cylinder 120 so as to protrude from the hollow portion of the drive cylinder 120, the piston bearing 241 moves along the inner peripheral surface of the drive cylinder 120, and then comes close to the bearing bush 240. In this manner, the movable cylinder 210 moves smoothly with respect to the drive cylinder 120. Further, at the opening end of the drive cylinder 120, a seal member 251 for sealing a gap between the drive cylinder 120 and the movable cylinder 210 is provided near the bearing bush 240. Further, an opening formed in a tip of the movable cylinder 210 is closed by a cap member 130a, and the cap member 130a is protruded from the opening end of the drive cylinder 120 at which the seal member 251 is provided. It should be noted that, in the cap member 130a, a clevis is formed, and thus the cap member 130a can be coupled to the swivel bracket 6 of the tilt-trim device.

Figure 11:
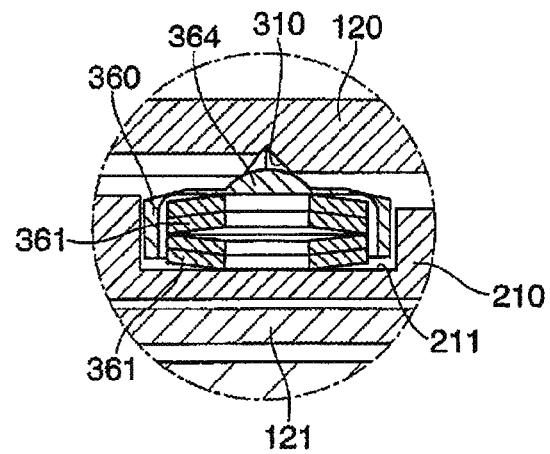
FIG. 11 An enlarged view illustrating details of a region XI of FIG. 10.

Further, a releasing mechanism 300 for engaging the movable cylinder 210 with the drive cylinder 120 is provided between the movable cylinder 210 and the drive cylinder 120. As illustrated in detail in FIG. 11, the releasing mechanism 300 includes: an annular engaging groove 310 formed in the inner peripheral surface of the drive cylinder 120 along the peripheral direction so as to have a V-shaped cross-section; and engaging elements 360 retained onto the outer peripheral surface of the movable cylinder 210 and biased toward the engaging groove 310. The engaging elements 360 are opposed to the engaging groove 310 under a state in which the movable cylinder 210 is retracted into the drive cylinder 120, that is, under the state illustrated in FIG. 10. In this state, the engaging elements 360 partially enter the engaging groove 310, to thereby couple the movable cylinder 210 and the drive cylinder 120 together.

Figure 12:
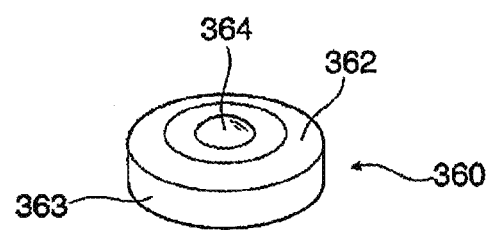
FIG. 12 A perspective view of an engaging element according to the second embodiment of the present invention.

In the outer peripheral surface of the movable cylinder 210, a plurality of circular recesses 211 for accommodating the engaging elements 360 therein are formed along the peripheral direction. A plurality of belleville springs 361 are superposed and arranged in each of the recesses 211, and each of the engaging elements 360 is arranged so as to cover the belleville springs 361. FIG. 12 is a perspective view of the engaging element 360. The engaging element 360 is formed in such a manner that a disk portion 362 is surrounded by a side wall 363 so as to form an accommodating portion for the belleville springs 361, and a convex spherical surface 364 fitted into the engaging groove 310 is formed at a center of the disk portion 362. Therefore, the engaging element 360 is biased by the belleville springs 361 from the movable cylinder 210 toward the drive cylinder 120, and is moved up and down in the recess 211 depending on a pressing force applied to the convex spherical surface 364 from the drive cylinder 120. Further, the engaging element 360 is not disengaged from the recess 211 of the movable cylinder 210 under a state in which the convex spherical surface 364 is fitted into the engaging groove 310.

Figure 13:
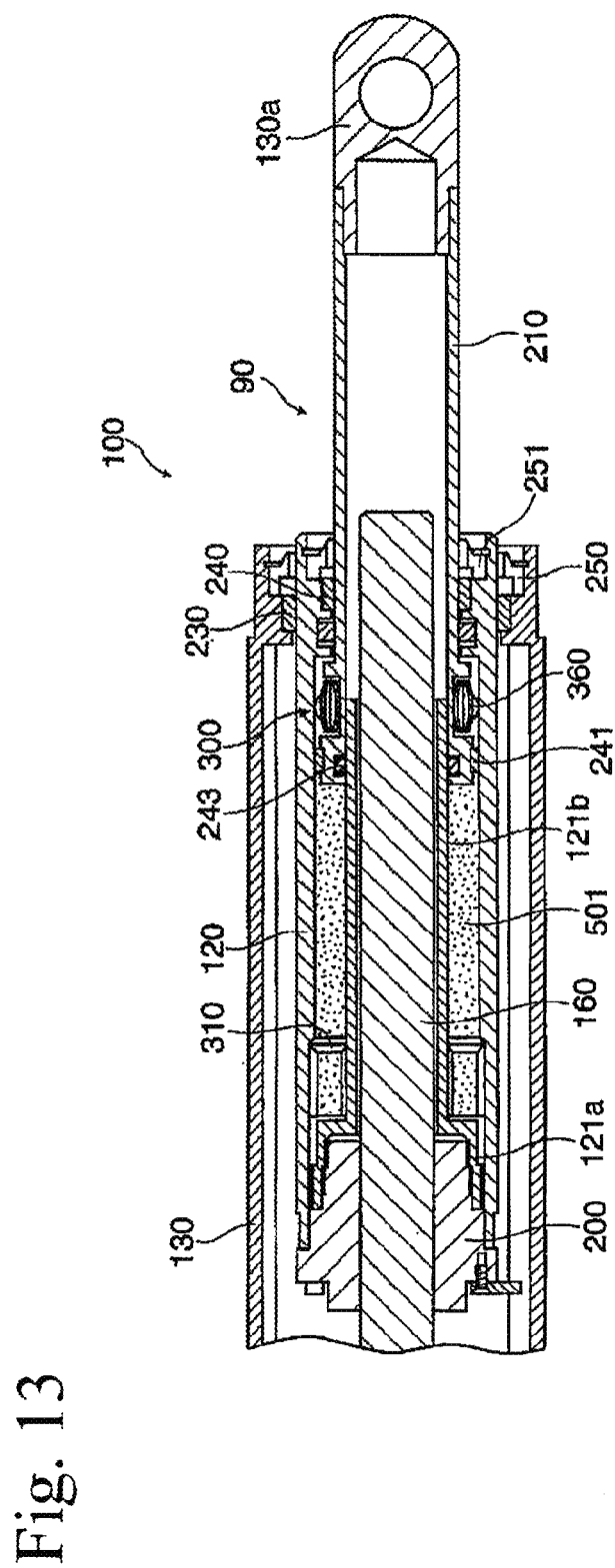
FIG. 13 A front cross-sectional view illustrating a state in which the outer cylinder is disengaged from the engaged position in the electric actuator according to the second embodiment of the present invention.

Operations of the releasing mechanism 300 are the same as the above-mentioned operations of the releasing mechanism 30 according to the first embodiment. Under a state in which the engaging elements partially enter the engaging groove 310 as illustrated in FIG. 10, when the screw shaft 160 is rotated, the drive cylinder 120 and the movable cylinder 210 forming the output rod 90 move integrally, and thus the output rod 90 can be protruded from the housing 130, or retracted into the housing 130. Further, when a large axial load is applied to the movable cylinder 210 fixed to the swivel bracket 6, as illustrated in FIG. 13, the engaging elements 360 are disengaged from the engaging groove 310 of the drive cylinder 120, and thus the coupling state between the drive cylinder 120 and the movable cylinder 210 is released. In this manner, the movable cylinder 210 can move freely in the axial direction with respect to the housing 130 irrespective of rotation of the screw shaft 160, and the movable cylinder 210 can be drawn out from the opening end of the drive cylinder 120 under a state in which the drive cylinder 120 is accommodated in the housing 130.

On the other hand, also the electric actuator 10 according to the second embodiment includes a damping mechanism for suppressing sudden slide of the movable cylinder 210 with respect to the drive cylinder 120. As illustrated in FIG. 10, a working chamber 500 in which a viscous fluid such as an oil is hermetically contained is formed between the outer peripheral surface of the movable cylinder 210 and the inner peripheral surface of the drive cylinder 120. A U-shaped gasket 242 held in contact with the outer peripheral surface of the movable cylinder 210 is provided in a vicinity of the opening end of the drive cylinder 120, whereas the piston bearing 241 is provided at an end portion of the working chamber 500 on the nut member 200 side. The working chamber 500 is sealed by the U-shaped gasket 242 and the piston bearing 241.

Figure 14:
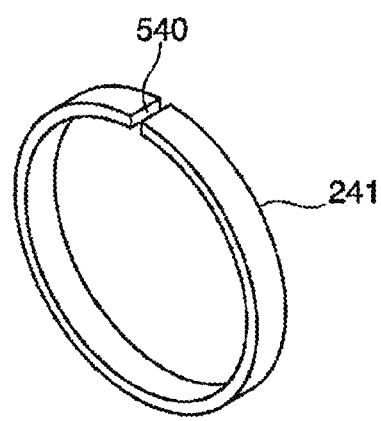
FIG. 14 A perspective view of a piston bearing according to the second embodiment of the present invention.

However, as illustrated in FIG. 14, a slit 540 is formed in a part of a circumference of the piston bearing 241, and the slit 540 functions as an orifice. Accordingly, when the movable cylinder 210 is gradually drawn out from the drive cylinder 120 from a state in which the movable cylinder 210 is accommodated in the hollow portion of the drive cylinder 120 (see FIG. 10), a volume of the working chamber 500 becomes gradually smaller, and hence the viscous fluid contained in the working chamber 500 flows into the slit (orifice) 540 formed in the piston bearing 241, and then is discharged from the working chamber 500.

As illustrated in FIG. 13, the viscous fluid, which flows from the working chamber 500 into the orifice 540, is discharged into a receiving chamber 501 formed between the small diameter portion 121b of the extended cylinder 121 and the drive cylinder 120. The receiving chamber 501 is an annular space formed between the small diameter portion 121b of the extended cylinder 121 and the drive cylinder 120, and is also a space accommodating the movable cylinder 210 therein before the movable cylinder 210 is drawn out from the drive cylinder 120. In order to prevent the viscous fluid flowing into the receiving chamber 501 from leaking through a gap between the extended cylinder 121 and the movable cylinder 210, an O-ring 243 held in contact with the small diameter portion 121b of the extended cylinder 121 is provided at the end portion of the movable cylinder 210 on the nut member 200 side. The O-ring 243 moves in the axial direction on the outer peripheral surface of the small diameter portion 121b in accordance with movement of the movable cylinder 210 with respect to the drive cylinder 120. That is, the small diameter portion 121b of the extended cylinder 121 is set so as to have an axial length long enough to prevent the O-ring 243 from being disengaged from the small diameter portion 121b even in a case where the movable cylinder 210 most protrudes from the drive cylinder 120.

When the viscous fluid flows from the working chamber 500 into the receiving chamber 501, a sectional area of the orifice 540 is extremely smaller than a sectional area of the working chamber 500, and hence resistance to flow acts on the viscous fluid. Thus, a damping force can be applied to sudden movement of the movable cylinder 210 with respect to the drive cylinder 120. That is, also in the electric actuator 100 according to the second embodiment, similarly to the first embodiment, structure modeled after an oil damper is imparted to the output rod 90. Accordingly, even when engagement of the movable cylinder 210 with the drive cylinder 120 by the releasing mechanism 300 is released, it is possible to avoid a risk that the movable cylinder 210 suddenly rushes out of the drive cylinder 120.

Also the electric actuator 100 according to the second embodiment configured as described above can be used similarly to the above-mentioned electric actuator 10 according to the first embodiment, and is most suitable as substitution of a hydraulic cylinder device.

Further, an entire axial length of the electric actuator 100 according to the second embodiment is smaller than that of the electric actuator 10 according to the first embodiment when the output rod 90 is accommodated in the housing 130. Accordingly, further reduction in size of the electric actuator is achieved. In the electric actuator 10 according to the first embodiment, the partition wall 53 provided to the movable cylinder 12 partitions the working chamber 50 into the first working chamber and the second working chamber, and the partition wall 53 changes a volume of the first working chamber and a volume of the second working chamber in accordance with movement of the movable cylinder 12 with respect to the drive cylinder 21. Therefore, the movable cylinder 12 needs to have a length about twice as long as a length of the drive cylinder 21.

In contrast, in the electric actuator 100 according to the second embodiment, the movable cylinder 210 is accommodated in the annular space formed between the drive cylinder 120 and the extended cylinder 121, and the working chamber 500 for the viscous fluid is formed between the drive cylinder 120 and the movable cylinder. When the movable cylinder 210 moves with respect to the drive cylinder 120, the annular space is used as the receiving chamber 501 for the viscous fluid. Accordingly, the axial length of the movable cylinder 210 can be set to be equal to or slightly smaller than the axial length of the drive cylinder 120. Thus, the electric actuator 100 according to the second embodiment is suitable for downsizing.

It should be noted that, in the above-mentioned electric actuators according to the first embodiment and the second embodiment, the drive cylinder and the movable cylinder are each formed into a cylindrical shape. As long as the drive cylinder and the movable cylinder each have a hollow portion, design of shapes of the drive cylinder and the movable cylinder may be changed as appropriate.

Further, the above-mentioned electric actuators according to the embodiments have such a configuration that the movable cylinder freely protrudes from the housing in a case where an impact load is applied to the movable cylinder. Conversely, the movable cylinder may be received in the housing at the time of application of the impact load.

Further, in the above-mentioned electric actuators according to the embodiments, the damping mechanism is built in a gap between the movable cylinder and the drive cylinder, but this is not an essential configuration for the electric actuators according to the present invention. A damping device such as an oil damper may be provided in parallel outside the electric actuator.

Still further, in the second embodiment, unlike the first embodiment, the coil spring for restoring the movable cylinder to the engaged position is not provided. For example, an elastic member for biasing the swivel bracket 6 in a direction of moving the swivel bracket 6 close to the clamp bracket 4 may be provided to the tilt-trim device.

Still further, each of the above-mentioned embodiments describes the example in which the electric actuator according to the present invention is used as the tilt-trim device of the outboard motor. However, another use of the electric actuator according to the present invention is possible.

The invention claimed is:

1. An electric actuator, comprising:
a housing fixed to a first structure; an output rod comprising a hollow portion, the output rod being fixed to a second structure and retained so as to freely protrude from and retract into the housing;
a screw shaft, which is held by the housing so as to be rotatable, inserted into the hollow portion of the output rod, and is rotated by an electric motor as appropriate; and
a nut member, which is provided to the output rod, mounted to the screw shaft, and is moved in an axial direction in accordance with rotation of the screw shaft, the output rod comprising:
a drive cylinder to which the nut member is provided; and
a movable cylinder to which the second structure is fixed, the movable cylinder and the drive cylinder each being hollow and are arranged around the screw shaft to overlap one another and the movable cylinder configured to freely advance and retreat with respect to the drive cylinder,
the electric actuator further comprising a releasing mechanism provided between the drive cylinder and the movable cylinder, for engaging the movable cylinder with the drive cylinder and for allowing the movable cylinder to move with respect to the drive cylinder when a predetermined or more of axial force is applied to the movable cylinder fixed to the second structure,
wherein the movable cylinder being provided between the drive cylinder and the screw shaft.

2. The electric actuator according to claim 1, wherein the releasing mechanism comprises:
an engaging groove formed in the drive cylinder or the movable cylinder; and
an engaging element which is retained on the movable cylinder or the drive cylinder, the engaging element being biased toward the engaging groove, and fitted into the engaging groove.

3. The electric actuator according to claim 2,
wherein the engaging groove includes of an annular groove formed along a peripheral direction of the drive cylinder or along a peripheral direction of the movable cylinder so as to have a V-shaped cross-section, and
wherein the engaging element has a convex spherical surface fitted into the annular groove and includes a plurality of engaging elements arranged along a peripheral direction of the annular groove, each of the engaging elements being biased by a spring toward the annular groove.

4. The electric actuator according to claim 2, wherein a working chamber is provided between the drive cylinder and the movable cylinder, for hermetically containing a viscous fluid therein,
wherein the working chamber having an orifice into which the viscous fluid contained in the working chamber flows along with movement of the movable cylinder with respect to the drive cylinder.

5. The electric actuator according to claim 4, wherein an extended cylinder arranged around the screw shaft to overlap the drive cylinder,
wherein the nut member is fixed to the extended cylinder, and the movable cylinder is accommodated in an annular space formed between the drive cylinder and the extended cylinder, and
wherein the orifice is formed in an end portion of the movable cylinder on the nut member side, and the annular space is used as a receiving chamber for receiving the viscous fluid flowing into the orifice.

* * * * *